(12) United States Patent
Lin et al.

(10) Patent No.: US 12,511,831 B2
(45) Date of Patent: Dec. 30, 2025

(54) INDOOR STRUCTURED RECONSTRUCTION METHOD, APPARATUS, AND COMPUTER-READABLE STORAGE MEDIUM

(71) Applicant: ORBBEC INC., Guangdong (CN)

(72) Inventors: YueYu Lin, Shenzhen (CN); Haoli Zhou, Shenzhen (CN); Lin Wang, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 146 days.

(21) Appl. No.: 18/396,171

(22) Filed: Dec. 26, 2023

(65) Prior Publication Data

US 2024/0127535 A1    Apr. 18, 2024

Related U.S. Application Data

(63) Continuation of application No. PCT/CN2022/080521, filed on Mar. 13, 2022.

(30) Foreign Application Priority Data

Aug. 23, 2021 (CN) .......................... 202110968759.9

(51) Int. Cl.
  *G06T 17/05* (2011.01)
  *G06T 7/20* (2017.01)
  *G06T 17/20* (2006.01)
(52) U.S. Cl.
  CPC ................ *G06T 17/05* (2013.01); *G06T 7/20* (2013.01); *G06T 17/20* (2013.01); *G06T 2207/10028* (2013.01); *G06T 2207/30241* (2013.01)

(58) Field of Classification Search
  None
  See application file for complete search history.

(56) References Cited

U.S. PATENT DOCUMENTS

| | | | |
|---|---|---|---|
| 10,026,218 B1 | 7/2018 | Mertens et al. | |
| 10,692,280 B2 | 6/2020 | Shi et al. | |
| 2018/0330184 A1* | 11/2018 | Mehr | ....................... G06T 17/00 |
| 2019/0324474 A1* | 10/2019 | Wendt | .................. G05D 1/0219 |

(Continued)

FOREIGN PATENT DOCUMENTS

| | | |
|---|---|---|
| CN | 109325998 A | 2/2019 |
| CN | 109887082 A | 6/2019 |

(Continued)

OTHER PUBLICATIONS

PCT International Search Report and the Written Opinion mailed May 23, 2022, issued in related International Application No. PCT/CN2022/080521, with partial English translation (9 pages).

*Primary Examiner* — Frank S Chen
(74) *Attorney, Agent, or Firm* — Sheppard Mullin Richter & Hampton LLP (57) ABSTRACT

A method includes: obtaining and splicing a plurality of frames of point cloud data to obtain a complete point cloud model of an indoor structure; extracting point cloud plane features corresponding to the complete point cloud model, and classifying the point cloud plane features into indoor structure types comprising a floor, a wall, and a ceiling; projecting point cloud data of the wall onto a plane of the floor to generate a planar grid graph; and generating a two-dimensional plane view of the indoor structure based on the planar grid graph.

20 Claims, 4 Drawing Sheets

(56) References Cited

U.S. PATENT DOCUMENTS

2020/0342674 A1* 10/2020 Chen .......................... G06T 7/50
2020/0364929 A1* 11/2020 Li ............................. G06T 7/62
2021/0279950 A1*  9/2021 Phalak .................. G06F 18/231

FOREIGN PATENT DOCUMENTS

CN          110009727 A       7/2019
CN          113888391 A       1/2022

* cited by examiner

INDOOR STRUCTURED RECONSTRUCTION METHOD, APPARATUS, AND COMPUTER-READABLE STORAGE MEDIUM

CROSS-REFERENCE TO RELATED APPLICATIONS

This application is a Continuation Application of International Patent Application No. PCT/CN2022/080521, filed on Mar. 13, 2022, which is based on and claims priority to and benefits of Chinese Patent Application No. 202110968759.9, and filed with the China National Intellectual Property Administration on Aug. 23, 2021. The entire content of all of the above-referenced applications is incorporated herein by reference.

TECHNICAL FIELD

This application relates to the technical field of modeling, and in particular, to an indoor structure reconstruction method, an apparatus, and a non-transitory computer-readable storage medium.

BACKGROUND

Accompanied with the continuous development of the science and technology, modeling of indoor environments has become one of the important research topics in the field of virtual reality technologies, is widely used in fields such as transportation, medical treatment, and military, and has a far-reaching significance for the social development.

In the existing indoor environment modeling applications, the indoor structure reconstruction is usually performed in a form of manual modeling based on the manual measurement or drawings. In other words, features of an indoor structure (for example, a floor, a wall, or a ceiling) are obtained through artificial feature recognition and then the indoor environment reconstruction is performed with reference to the drawings of the indoor structure. However, the reconstruction method usually has a large error in feature obtaining and consumes a large amount of labor and time, resulting in that the generated indoor environment model has a low accuracy and a low efficiency.

SUMMARY

Embodiments of this application provide an indoor structure reconstruction method, an apparatus, and a non-transitory computer-readable storage medium, which can solve at least the problems of the low modeling accuracy and the low efficiency of the indoor structure reconstruction in the existing technologies due to the use of manual modeling.

A first aspect of the embodiments of this application provides an indoor structure reconstruction method, including: obtaining and splicing a plurality of frames of point cloud data to obtain a complete point cloud model of an indoor structure; extracting point cloud plane features corresponding to the complete point cloud model, and classifying the point cloud plane features into indoor structure types comprising a floor, a wall, and a ceiling; and projecting point cloud data of the wall onto a plane of the floor to generate a planar grid graph; and generating a two-dimensional plane view of the indoor structure based on the planar grid graph.

A second aspect of the embodiments of this application provides an indoor structure reconstruction apparatus, including: an acquisition module, configured to scan an indoor structure, to obtain a plurality of frames of point cloud data; a splicing module, configured to splice the plurality of frames of point cloud data, to obtain a complete point cloud model of the indoor structure; a classifying module, configured to extract point cloud plane features corresponding to the complete point cloud model and classify the point cloud plane features into indoor structure types including a floor, a wall, and a ceiling; a first generation module, configured to project point cloud data of the wall onto a plane of the floor to generate a planar grid graph; and a second generation module, configured to generate a two-dimensional plane view of the indoor structure based on the planar grid graph.

According to a third aspect of the embodiments of this application, an electronic device is provided, including: a memory and a processor, where the processor is configured to execute a computer program stored on the memory, and the computer program, when executed by the processor, implements steps of the indoor structure reconstruction method provided in the first aspect of the embodiments of this application.

According to a fourth aspect of the embodiments of this application, a non-transitory computer-readable storage medium is provided. The non-transitory computer-readable storage medium stores a computer program, and the computer program, when executed by a processor, implements steps of the indoor structure reconstruction method provided in the first aspect of the embodiments of this application.

Hence, according to the indoor structure reconstruction method, apparatus, and non-transitory computer-readable storage medium provided in the embodiments of this application, a plurality of frames of point cloud data are obtained for splicing, to obtain a complete point cloud model of an indoor structure; point cloud plane features corresponding to the complete point cloud model are extracted and the point cloud plane features are classified into indoor structure types including a floor, a wall, and a ceiling; point cloud data of the wall is projected onto a plane of the floor to generate a planar grid graph; and a two-dimensional plane view of the indoor structure is generated based on the planar grid graph. Through the implementation of the embodiments of this application, feature analysis is performed based on the scanned point cloud data, the accuracy of acquisition of indoor structure features is higher, and the effectiveness of modeling in a complex environment can be improved.

DETAILED DESCRIPTION

In order to make the objectives, features, advantages of this application more apparent and easier to understand, the technical solutions in the embodiments of this application are clearly and comprehensively described below with reference to the accompanying drawings in the embodiments of this application. Apparently, the described embodiments are merely some rather than all of the embodiments of this application. The embodiments obtained by a person skilled in the art based on the embodiments of this application without creative efforts shall fall within the protection scope of this application.

Figure 1:
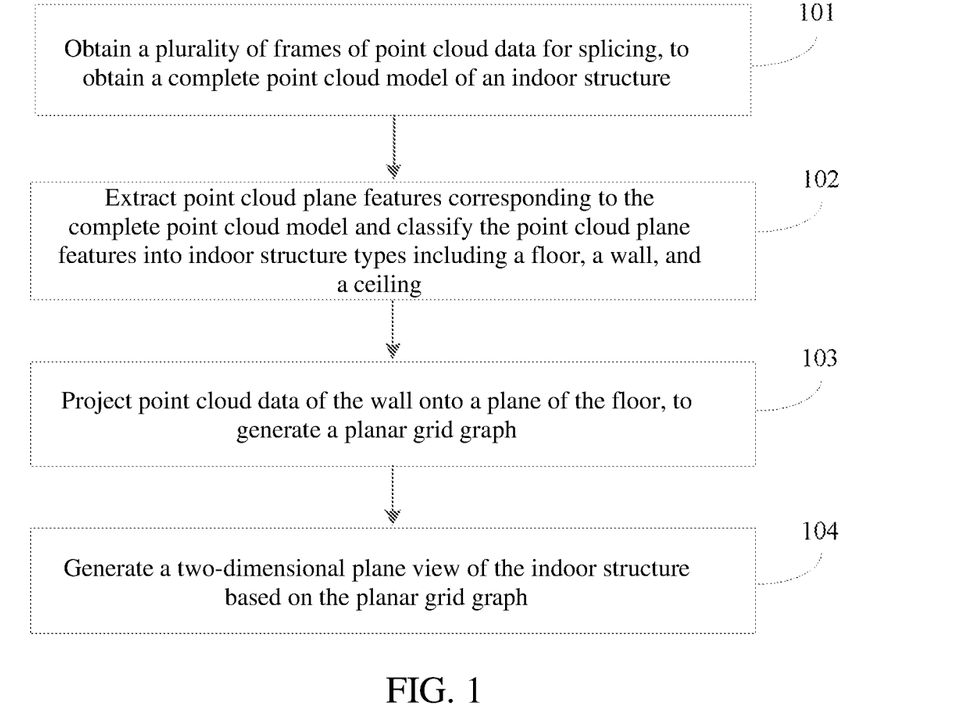
FIG. 1 is a basic flowchart of an indoor structure reconstruction method, according to a first embodiment of this application.

To solve the problem of the low modeling accuracy and low efficiency of the indoor structure reconstruction due to the use of manual modeling in the related technologies, a first embodiment of this application provides an indoor structure reconstruction method. FIG. 1 is a basic flowchart of an indoor structure reconstruction method provided in this embodiment. The indoor structure reconstruction method includes the following steps.

Step 101: Obtaining a plurality of frames of point cloud data for splicing, to obtain a complete point cloud model of an indoor structure.

In an embodiment, the indoor structure may be scanned by an acquisition module (e.g., a scanner) to obtain point cloud data. For example, an indoor environment may be scanned by a mobile LiDAR in all directions. The LiDAR may include a mobile backpack radar. The LiDAR may acquire a plurality of frames of point cloud data during its movement. Then, each of the frames of the point cloud data is spliced to form a complete point cloud model of the indoor structure. It should be noted that in addition to the mobile LiDAR, a depth camera, a 3D scanner, or the like may also be used to obtain a plurality of frames of point cloud data of the indoor structure. The depth camera includes but is not limited to a camera based on a time-of-flight (TOF) method such as indirect time-of-flight (iToF) or direct time-of-flight (dToF), based on binocular vision, or based on structure light, which is not limited herein.

Step 102: Extracting point cloud plane features corresponding to the complete point cloud model and classifying the point cloud plane features into indoor structure types including a floor, a wall, and a ceiling.

For example, the indoor structure types of this embodiment include: a floor, a wall, and a ceiling. In a practical application, a random sample consensus (RANSAC) algorithm may be used for extracting large plane features of the point clouds. In this embodiment, in a reconstructed point cloud model, the z axis is approximately upwards perpendicular to the floor, and indoor planes may be classified according to a planar normal orientation and height information.

In some embodiments, before the step of extracting point cloud plane features corresponding to the complete point cloud model, the method also includes: obtaining point cloud density statistical information corresponding to the complete point cloud model; and removing point cloud data of an area having a density lower than a preset density threshold from the complete point cloud model based on the point cloud density statistical information.

Interference factors such as mobile characters and glass reflection may exist in a complex indoor environment. Therefore, a large amount of noise may exist in the complete point cloud model obtained by splicing all pieces of the point cloud data, and the accuracy of indoor structure reconstruction based on the complete point cloud model is low. In view of the above, in this embodiment, a large amount of noise caused by a dynamic prospect (for example, a pedestrian) and glass reflection in the indoor environment is eliminated by filtering out a point cloud in a low-density area through de-noising and filtering of the model based on the point cloud density statistical information. The point cloud in the low-density area may be understood as outliers.

Step 103: Projecting point cloud data of the wall onto a plane of the floor, to generate a planar grid graph.

For example, in this embodiment, a wall point cloud is rasterized, and point cloud data of the wall is projected onto an xOy plane (that is, the floor), to generate a planar grid graph. It should be noted that the point cloud rasterization is to process an area scanned by the acquisition module by meshing. Each grid point cloud represents a small area of space which includes a portion of the point clouds.

In some embodiments, before the step of projecting point cloud data of the wall onto a plane of the floor, to generate a planar grid graph, the method also includes: detecting a near-orthogonal and/or near-parallel point cloud plane among all point cloud planes; and regularizing the near-orthogonal and/or near-parallel point cloud plane by adjusting a corresponding plane equation, to obtain a completely-orthogonal and/or completely-parallel point cloud plane.

Relative relationships between different planes include: an orthogonal relationship and a parallel relationship. However, in a practical application, the point cloud planes are not absolutely orthogonal or absolutely parallel. In this embodiment, to improve the model display effect, near-orthogonal and/or near-parallel point cloud planes are first detected from all the point cloud planes of the complete point cloud model, and then the detected near-orthogonal and/or near-parallel point cloud planes are regularized, such that the near-orthogonal planes are orthogonalized and the near-parallel point cloud planes are parallelized, to achieve the effect of completely-orthogonal or completely-parallel between the planes.

In addition, to further improve the model's display effect, for facilitating a subsequent operation such as generation of a floor plane view, in this embodiment, three concentrated directions of planar normals may also be counted, and a pose of the complete point cloud model may be corrected according to the three concentrated directions, so that the z axis is completely upwards perpendicular to the floor, and the x and y axes are parallel to a main large wall.

Step 104: Generating a two-dimensional plane view of the indoor structure based on the planar grid graph.

Before the step of generating a two-dimensional plane view of the indoor structure based on the planar grid graph, first, corresponding trajectory data when the acquisition module moves to scan each frame of the point cloud data is obtained, and then the trajectory data is projected onto the plane of the floor. Then, point cloud data of all walls on the planar grid graph are triangulated, to obtain a plurality of triangles of point cloud data of which circumscribed circles include no wall. A triangle outside a visible range of sight is eliminated by using the trajectory data, to obtain a two-dimensional floor mesh model. A wall vector line in the two-dimensional floor mesh model is regularized, to obtain a two-dimensional plane view of the indoor structure.

Figure 2:
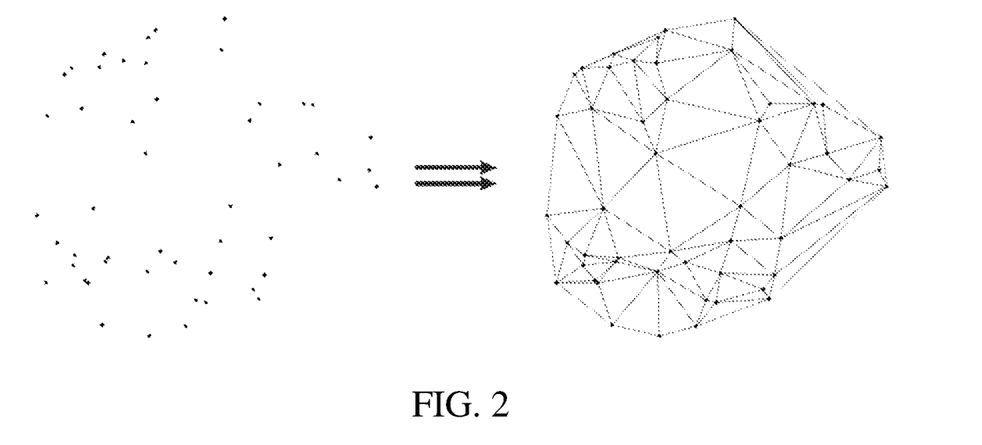
FIG. 2 is a schematic diagram of triangulation of point cloud data, according to the first embodiment of this application.

For example, wall points on the grid graph are a plurality of discrete points. In this embodiment, the discrete wall points on the grid graph are triangulated, and a set of points is connected to form a triangle of a particular size. FIG. 2 is a schematic diagram of triangulation of point cloud data provided in this embodiment. The triangulated plane view has the following features. First, edges in the plane view do not include any point in the set of points, except for end points. Second, there are no intersecting edges. Third, all faces in the plane view are triangular faces, and a set of all triangular faces is a convex hull of a set of discrete points.

In a practical application, the most widely used triangulation is Delaunay triangulation. For the Delaunay triangulation, there is a circle that passes through two points, and the circle does not include any other point in the set of points. In other words, the circle has the properties of a hollow circle.

In this embodiment, after triangulation processing of the planar grid graph, spatial engraving processing is further performed by using the trajectory data of the acquisition module. A line of sight starts from a trajectory point, a triangle that does not intersect with the line of sight (that is, outside the visible range) is removed, and an internal triangle is left, to obtain a two-dimensional floor mesh model. Boundaries of the mesh are wall vector lines of the two-dimensional plane view. Through the processing, a portion of missing walls can be supplemented, to obtain a completely closed plane view.

Further, the two-dimensional floor mesh model is smoothed and regularized, to enable a wall vector to be flat, a near-orthogonal plane to be completely-orthogonal, and a near-parallel plane to be completely-parallel, to obtain the two-dimensional plane view of the indoor structure.

In some embodiments, after the step of generating a two-dimensional plane view of the indoor structure based on the planar grid graph, the method further includes: obtaining each frame of point cloud data and corresponding trajectory data of an acquisition module when the acquisition module moves to scan; obtaining door opening data corresponding to the point cloud data of the wall according to the trajectory data; obtaining room segmentation information of the two-dimensional plane view based on the door opening data; and generating a two-dimensional plane view having a room mark and a door mark based on the room segmentation information. The door opening data indicates the location at which the door would be installed on the wall and dimensional data of the hole/opening on the wall for installing the door.

For example, the trajectory data of the acquisition module in this embodiment is pose data. In this embodiment, during obtaining of the door opening data, a wall point cloud through which a trajectory line passes may be extracted and projected onto the plane of the wall. Then, taking a trajectory point as a growth starting point, and the growth starting point is used as a reference point for determining whether there is a correlation between other point clouds. Subsequently, similar point clouds around the growth starting point are distinguished according to a determining rule, the point clouds having a high similarity is merged to complete the regional growth. In this embodiment, a hollow area is extracted as a door opening. An edge of the door opening may be smoothed and regularized. Further, in this embodiment, a position and a width of the door opening are marked on a related wall of the plane view, to obtain a plane view having a door mark. Then, the regional growth of triangles may be performed at two sides of the door by using the door opening data, that is, the two sides of the door pertain to different rooms, to obtain room segmentation information of the plane view. Finally, a two-dimensional plane view having a room mark and the door mark is outputted.

In some embodiments, after the step of generating a two-dimensional plane view of the indoor structure based on the planar grid graph, the method further includes: obtaining the trajectory data corresponding to each frame of point cloud data scanned by the acquisition module while in motion; and obtaining ceiling height data of the indoor structure; obtaining door opening data corresponding to the point cloud data of the wall according to the trajectory data; and generating a three-dimensional stereoscopic view of the indoor structure by combining the two-dimensional plane view, the ceiling height data, and the door opening data.

Further, the step of generating a three-dimensional perspective elevation of the indoor structure by combining the two-dimensional plane view, the ceiling height data, and the door opening data includes: generating a three-dimensional mesh model based on the two-dimensional plane view and the ceiling height data; extracting, based on the door opening data, a first wall mesh where a door opening is located, and adding door opening contour points to the first wall mesh, to obtain a second wall mesh having the door opening; and replacing a raw wall mesh in the three-dimensional mesh model with the second wall mesh having the door opening, and generating a three-dimensional stereoscopic view of the indoor structure.

For example, in this embodiment, a room height is obtained by analyzing a median ceiling height of each room and the three-dimensional mesh model may be directly generated based on a plane view mesh. Then, the first wall mesh where the door opening is located is extracted, the previously obtained contour points of the door opening are added, and Delaunay triangulation is performed, to obtain the second wall mesh having the door opening. Finally, the raw wall mesh is replaced with the second wall mesh having the door opening, to obtain a final three-dimensional CAD model. It should be noted that, compared with the implementation of direct triangulation from point cloud data, by using the method of this embodiment, a portion of missing ceilings due to the wall hollow caused by blocking of various foregrounds (for example, pedestrians or the like) can be supplemented, the modeling speed is more rapid, and the three-dimensional CAD model is a lightweight model, which is convenient for a mobile terminal to store and display. In addition, manual intervention in a modeling stage is reduced and the model is more accurate.

Based on the technical solution of this embodiment of this application, a plurality of frames of point cloud data scanned by the acquisition module are spliced to obtain a complete point cloud model of an indoor structure; point cloud plane features corresponding to the complete point cloud model are extracted, and different indoor structure types are grouped based on the point cloud plane features; point cloud data of a wall is projected onto a plane of the floor to generate a planar grid graph; and a two-dimensional plane view of the indoor structure is generated based on the planar grid graph. Through implementation of the solutions of this application, feature analysis is performed based on the point cloud data scanned by the acquisition module, the accuracy of acquisition of the indoor structure features is higher, and the effectiveness of modeling in a complex environment can be improved.

Figure 3:
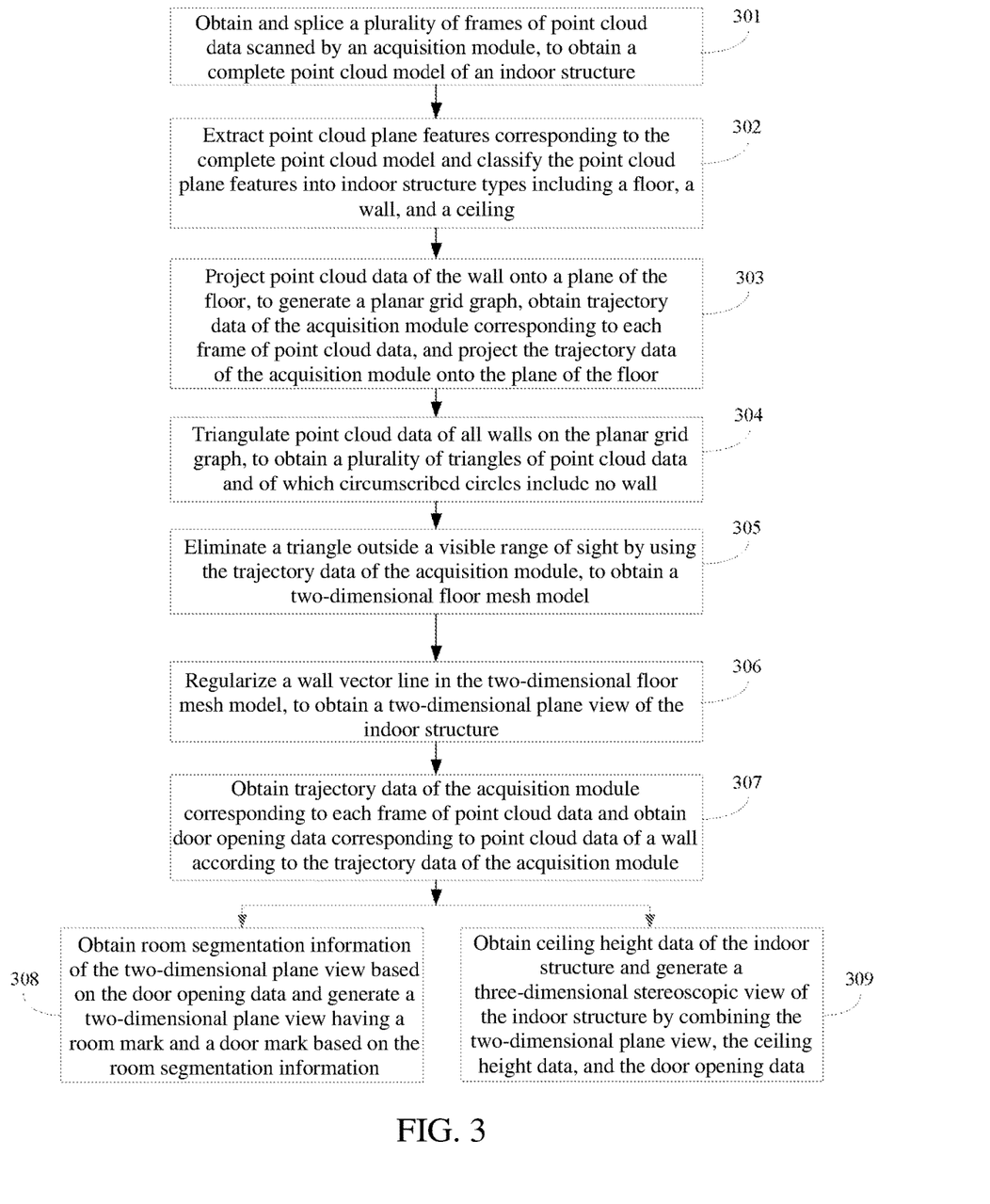
FIG. 3 is a detailed flowchart of an indoor structure reconstruction method, according to a second embodiment of this application.

FIG. 3 illustrates a detailed indoor structure reconstruction method provided in a second embodiment of this application. The indoor structure reconstruction method includes the following steps.

Step 301: Obtaining and splicing a plurality of frames of point cloud data scanned by an acquisition module while in motion, to obtain a complete point cloud model of an indoor structure.

Step 302: Extracting point cloud plane features corresponding to the complete point cloud model and classifying the point cloud plane features into indoor structure types including a floor, a wall, and a ceiling.

For example, the indoor structure types of this embodiment include: a floor, a wall, and a ceiling. In a practical application, the point cloud plane features may be implemented based on a random sample consensus algorithm. It should be understood that in this embodiment, to eliminate model noise and improve the accuracy of subsequent indoor structure reconstruction, a point cloud in a low-density area may be filtered out through de-noising and filtering of the model based on the point cloud density statistical information before extracting the features.

Step 303: Projecting point cloud data of the wall onto a plane of the floor, to generate a planar grid graph, obtaining trajectory data of the acquisition module corresponding to each frame of point cloud data, and projecting the trajectory data of the acquisition module onto the plane of the floor.

For example, in this embodiment, a wall point cloud is rasterized, and model wall points are projected onto an xOy plane (that is, the floor), to generate a planar grid graph; and each frame of trajectory points of the acquisition module is projected onto the xOy plane.

Step 304: Triangulating point cloud data of all walls on the planar grid graph, to obtain a plurality of triangles of point cloud data and of which circumscribed circles include no wall.

For example, wall points on the grid graph are a plurality of discrete points. In this embodiment, the discrete wall points on the grid graph are triangulated, and a set of points are connected to form a triangle of a particular size.

Step 305: Eliminating a triangle outside a visible range of sight by using the trajectory data of the acquisition module, to obtain a two-dimensional floor mesh model.

For example, after triangulation processing of the planar grid graph, spatial engraving processing is further performed by using the trajectory data of the acquisition module. A line of sight starts from a trajectory point, a triangle that does not intersect with the line of sight (that is, outside the visible range) is removed, and an internal triangle is left, to obtain a two-dimensional floor mesh model.

Step 306: Regularizing a wall vector line in the two-dimensional floor mesh model, to obtain a two-dimensional plane view of the indoor structure.

For example, in this embodiment, the two-dimensional floor mesh model is smoothed and regularized, for a wall vector to be flat, a near-orthogonal plane to be completely-orthogonal, and a near-parallel plane to be completely-parallel, to obtain the two-dimensional plane view of the indoor structure.

Step 307: Obtaining trajectory data of the acquisition module corresponding to each frame of point cloud data and obtaining door opening data corresponding to point cloud data of a wall according to the trajectory data of the acquisition module.

In this embodiment, during obtaining of the door opening data, a wall point cloud through which a trajectory line passes may be extracted and projected onto the plane of the wall. Then, taking a trajectory point as a growth starting point, the growth starting point is used as a reference point for determining whether there is a correlation between other point clouds. Subsequently, similar point clouds around the growth starting point are distinguished according to a determining rule, point clouds having a high similarity is merged, to complete the regional growth. In this embodiment, a void area is extracted as a door opening. An edge of the door opening may be smoothed and regularized.

Step 308: Obtaining room segmentation information of the two-dimensional plane view based on the door opening data and generating a two-dimensional plane view having a room mark and a door mark based on the room segmentation information.

For example, in this embodiment, a position and a width of the door opening are marked on a related wall of the plane view, to obtain a plane view having a door mark. Then, regional growth of triangles may be performed at two sides of the door by using the door opening data, that is, the two sides of the door pertain to different rooms, to obtain room segmentation information of the plane view. Finally, a two-dimensional plane view having a room mark and the door mark is outputted.

Step 309: Obtaining ceiling height data of the indoor structure and generating a three-dimensional stereoscopic view of the indoor structure by combining the two-dimensional plane view, the ceiling height data, and the door opening data.

For example, in this embodiment, a room height is obtained by analyzing a median ceiling height of each room, and the three-dimensional mesh model may be directly generated based on a plane view mesh. Then, a first wall mesh having the door opening is extracted, the previously obtained contour points of the door opening are added, and Delaunay triangulation is performed, to obtain the second wall mesh having the door opening. Finally, the raw wall mesh is replaced with the second wall mesh having the door opening, to obtain a final three-dimensional CAD model. It should be noted that the three-dimensional perspective elevation of the indoor structure may also be generated by combining the two-dimensional plane view having the room mark and the door mark obtained in step 308 and based on the ceiling height data, which is not limited herein.

It should be understood that the order of the sequence of the steps in the embodiments does not mean the order of execution, and the execution order of each process is determined according to functions and logic of the process, and does not construe any limitation on the implementation process of the embodiments of this application.

Based on the technical solution of this embodiment of this application, by automatically reconstructing a two-dimensional plane view and a three-dimensional CAD model of an indoor scene through plane feature analysis and scanning trajectory analysis of the indoor scene, the technical solution has the features of automatic room segmentation and door opening standards, can resist interference of a complex environment, is suitable for modeling of an indoor environment having a large number of people such as a shopping mall, effectively saves the time of manual modeling, reduces manual intervention in a modeling stage, and has a more accurate model.

Figure 4:
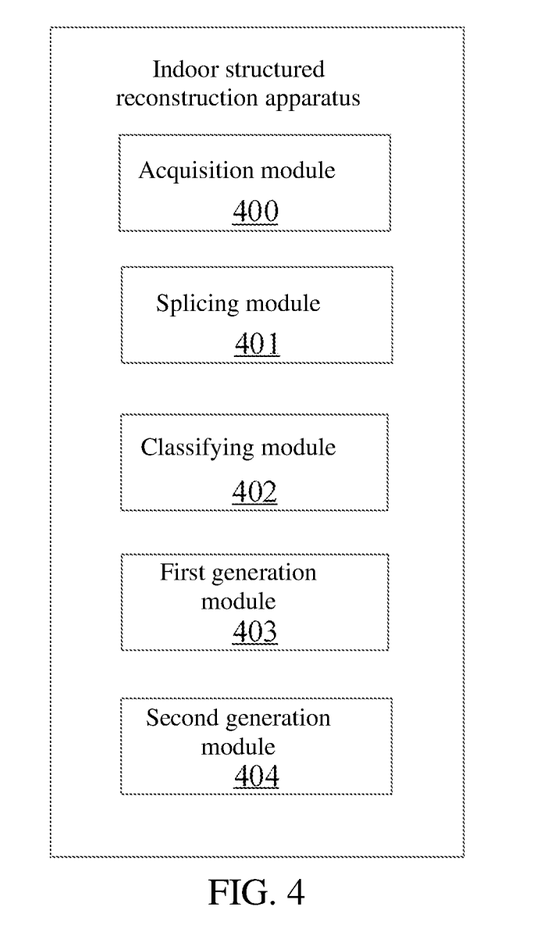
FIG. 4 is a schematic diagram of modules of an indoor structure reconstruction apparatus, according to a third embodiment of this application.

FIG. 4 illustrates an indoor structure reconstruction apparatus, according to a third embodiment of this application. The indoor structure reconstruction apparatus can be used to implement the indoor structure reconstruction method in the foregoing embodiments. The indoor structure reconstruction apparatus mainly includes:

an acquisition module 400, for scanning an indoor structure, to obtain a plurality of frames of point cloud data;

a splicing module 401, configured to splice the plurality of frames of point cloud data scanned by the acquisition module, to obtain a complete point cloud model of the indoor structure;

a classifying module 402, configured to extract point cloud plane features corresponding to the complete point cloud model and classify the point cloud plane features into indoor structure types including a floor, a wall, and a ceiling;

a first generation module 403, configured to project point cloud data of the wall onto a plane of the floor to generate a planar grid graph; and a second generation module 404, configured to generate a two-dimensional plane view of the indoor structure based on the planar grid graph.

In some embodiments, the indoor structure reconstruction apparatus of this embodiment further includes: a removal module, configured to: before extracting point cloud plane features corresponding to the complete point cloud model, obtain point cloud density statistical information corresponding to the complete point cloud model; and remove point cloud data of an area having a density lower than a preset density threshold from the complete point cloud model based on the point cloud density statistical information.

In some embodiments, the indoor structure reconstruction apparatus of this embodiment further includes: a processing module, configured to: before projecting point cloud data of the wall onto a plane of the floor, to generate a planar grid graph, detect a near-orthogonal and/or near-parallel point cloud plane among all point cloud planes; and regularize the near-orthogonal and/or near-parallel point cloud plane by adjusting a corresponding plane equation, to obtain a completely-orthogonal and/or completely-parallel point cloud plane.

In some embodiments, the indoor structure reconstruction apparatus of this embodiment further includes: a mapping module, configured to: before generating a two-dimensional plane view of the indoor structure based on the planar grid graph, obtain the trajectory data corresponding to each frame of point cloud data scanned by the acquisition module while in motion; and project the trajectory data onto the plane of the floor. Correspondingly, the second generation module is configured to: triangulate point cloud data of all walls on the planar grid graph, to obtain a plurality of triangles of point cloud data and of which circumscribed circles include no wall; eliminate a triangle outside a visible range of sight by using the trajectory data, to obtain a two-dimensional floor mesh model; and regularize a wall vector line in the two-dimensional floor mesh model, to obtain a two-dimensional plane view of the indoor structure.

In some embodiments, the indoor structure reconstruction apparatus of this embodiment further includes: a third generation module, configured to: after generating a two-dimensional plane view of the indoor structure based on the planar grid graph, obtain the trajectory data corresponding to each frame of point cloud data scanned by the acquisition module while in motion; obtain door opening data corresponding to the point cloud data of the wall according to the trajectory data; obtain room segmentation information of the two-dimensional plane view based on the door opening data; and generate a two-dimensional plane view having a room mark and a door mark based on the room segmentation information.

In some embodiments, the indoor structure reconstruction apparatus of this embodiment further includes: a fourth generation module, configured to: after generating a two-dimensional plane view of the indoor structure based on the planar grid graph, obtain the trajectory data corresponding to each frame of point cloud data scanned by the acquisition module while in motion, and obtain ceiling height data of the indoor structure; obtain door opening data corresponding to the point cloud data of the wall according to the trajectory data; and generate a three-dimensional stereoscopic view of the indoor structure by combining the two-dimensional plane view, the ceiling height data, and the door opening data.

Further, in some embodiments, during execution of a function of generating a three-dimensional stereoscopic view of the indoor structure by combining the two-dimensional plane view, the ceiling height data, and the door opening data, the fourth generation module is configured to: generate a three-dimensional mesh model based on the two-dimensional plane view and the ceiling height data; extract, based on the door opening data, a first wall mesh where a door opening is located and add door opening contour points to the first wall mesh where the door opening is located, to obtain a second wall mesh having the door opening; and replace a raw wall mesh in the three-dimensional mesh model with the second wall mesh having the door opening and generate a three-dimensional perspective elevation of the indoor structure.

It should be understood that the fourth generation module may also generate a three-dimensional stereoscopic view of the indoor structure by combining the two-dimensional plane view having the room mark and the door mark generated by the third generation module and the ceiling height data, which is not limited herein.

It should be noted that the indoor structure reconstruction methods in the first and second embodiments can be implemented based on the indoor structure reconstruction apparatus provided in this embodiment, and a person skilled in the art may clearly understand that, for convenience and simplicity of description, the working process of the indoor structure reconstruction apparatus described in this embodiment may refer to the corresponding process in the foregoing method embodiments, and details are not described herein again.

According to the indoor structure reconstruction apparatus provided in this embodiment, a plurality of frames of point cloud data obtained by being scanned by the acquisition module are spliced, to obtain a complete point cloud model of the indoor structure; point cloud plane features corresponding to the complete point cloud model are extracted and the point cloud plane features are classified into indoor structure types including a floor, a wall, and a ceiling based on the point cloud plane features; point cloud data of the wall is projected onto a plane of the floor to generate a planar grid graph; and a two-dimensional plane view of the indoor structure is generated based on the planar grid graph. Through implementation of the solutions of this application, feature analysis is performed based on the point cloud data obtained by being scanned by the acquisition module, the accuracy of acquisition of indoor structure feature is higher, and the effectiveness of modeling in a complex environment can be improved.

Figure 5:
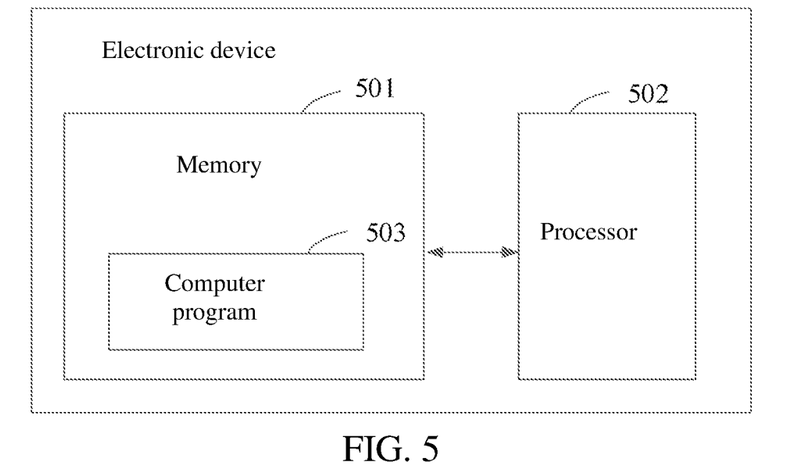
FIG. 5 is a schematic structural diagram of an electronic device, according to a fourth embodiment of this application.

FIG. 5 illustrates an electronic device, according to a fourth embodiment of this application. The electronic apparatus may be configured to implement the indoor structure reconstruction method in the foregoing embodiments and mainly includes:

a memory 501, a processor 502, and a computer program 503 stored on the memory 501 and executed on the processor 502. The memory 501 and the processor 502 are connected and communicated with each other. When the processor 502 executes the computer program 503, the indoor structure reconstruction method in the foregoing embodiments is implemented. There may be one or more processors.

The memory 501 may be a high-speed random access memory (RAM), and may further be a non-volatile memory, for example, a magnetic disk storage. The memory 501 is configured to store executable program code, and the processor 502 is coupled to the memory 501.

Further, the embodiments of this application further provide a computer-readable storage medium, such as a non-transitory computer-readable storage medium. The computer-readable storage medium may be arranged in the electronic device described in the foregoing embodiments, and the computer-readable storage medium may be the memory in the foregoing embodiments shown in FIG. 5.

The computer-readable storage medium stores a computer program, the computer program, when executed by the processor, implements the indoor structure reconstruction method in the foregoing embodiments. Further, the computer-readable storage medium may further be any medium that can store program code, such as a USB flash drive, a removable hard disk, a read-only memory (ROM), a RAM, a magnetic disk, or an optical disc.

In the embodiments provided in this application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual requirements to implement the objectives of the solutions of the embodiments.

In addition, functional modules in the embodiments of this application may be integrated into one processing module, or each of the modules may exist alone physically, or two or more modules may be integrated into one module. The foregoing integrated module may be implemented in the form of a hardware, or may be implemented in the form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the related art, all or some of the technical solutions may be implemented in a form of a software product. The computer software product is stored in a readable storage medium, and includes several instructions for instructing a computer device (which may be a personal computer, a server, a network device, or the like) to perform all or some of the steps of the methods in the embodiments of this application. The foregoing readable storage medium includes: any medium that can store program code, such as a USB flash disk, a removable hard disk, a ROM, a RAM, a magnetic disk, or an optical disc.

It should be noted that, for ease of description, the foregoing method embodiments are described as a series of action combinations. However, persons skilled in the art should know that this application is not limited to the described order of the actions because some steps may be performed in another order or performed at the same time according to this application. In addition, a person skilled in the art is also to learn that the embodiments described in this specification are some examples, and the involved actions and modules are not necessarily required to this application.

In the foregoing embodiments, descriptions of the embodiments have different emphases. As for parts that are not described in detail in, reference can be made to the relevant descriptions of the other embodiments.

The indoor structure reconstruction method, apparatus, and computer-readable storage medium provided in the embodiments of this application are described above. A person skilled in the art may make modifications to the specific implementations and application scopes according to the ideas of this application. In conclusion, the content of the specification should not be construed as a limitation to this application.

What is claimed is:

1. A method, comprising:
    obtaining and splicing a plurality of frames of point cloud data to obtain a complete point cloud model of an indoor structure;
    extracting point cloud plane features corresponding to the complete point cloud model, and classifying the point cloud plane features into indoor structure types comprising a floor, a wall, and a ceiling;
    projecting point cloud data of the wall onto a plane of the floor to generate a planar grid graph; and
    generating a two-dimensional plane view of the indoor structure based on the planar grid graph.

2. The method according to claim 1, wherein before the extracting the point cloud plane features corresponding to the complete point cloud model, the method further comprises:
    obtaining point cloud density statistic information corresponding to the complete point cloud model; and
    removing point cloud data of an area having a density lower than a density threshold from the complete point cloud model based on the point cloud density statistic information.

3. The method according to claim 1, wherein before the projecting the point cloud data of the wall onto the plane of the floor to generate the planar grid graph, the method further comprises:
    determining point cloud planes in the complete point cloud model;
    detecting a near-orthogonal point cloud plane and/or a near-parallel point cloud plane among the point cloud planes; and
    regularizing the near-orthogonal point cloud plane and/or the near-parallel point cloud plane by adjusting a corresponding plane equation, to obtain an orthogonal point cloud plane and/or a parallel point cloud plane.

4. The method according to claim 1, wherein the generating the two-dimensional plane view of the indoor structure based on the planar grid graph comprises:
    obtaining trajectory data corresponding to each frame of point cloud data scanned by a scanner while in motion;
    projecting the trajectory data onto the plane of the floor;
    triangulating point cloud data of walls on the planar grid graph, to obtain a plurality of triangles of point cloud data of which circumscribed circles comprise no wall;
    eliminating a triangle outside a visible range of sight according to the trajectory data, to obtain a two-dimensional floor mesh model; and
    regularizing a wall vector line in the two-dimensional floor mesh model, to obtain the two-dimensional plane view of the indoor structure.

5. The method according to claim 1, wherein after the generating the two-dimensional plane view of the indoor structure based on the planar grid graph, the method further comprises:

obtaining trajectory data corresponding to each frame of point cloud data scanned by a scanner while in motion;

obtaining door opening data corresponding to the point cloud data of the wall according to the trajectory data;

obtaining room segmentation information of the two-dimensional plane view based on the door opening data; and generating a two-dimensional plane view having a room mark and a door mark based on the room segmentation information.

6. The method according to claim 1, wherein after the generating the two-dimensional plane view of the indoor structure based on the planar grid graph, the method further comprises:

obtaining trajectory data corresponding to each frame of point cloud data scanned by a scanner while in motion, and obtaining ceiling height data of the indoor structure;

obtaining door opening data corresponding to the point cloud data of the wall according to the trajectory data; and generating a three-dimensional stereoscopic view of the indoor structure according to the two-dimensional plane view, the ceiling height data, and the door opening data.

7. The method according to claim 6, wherein the generating the three-dimensional stereoscopic view of the indoor structure according to the two-dimensional plane view, the ceiling height data, and the door opening data comprises:

generating a three-dimensional mesh model based on the two-dimensional plane view and the ceiling height data;

extracting, based on the door opening data, a first wall mesh where a door opening is located, and adding door opening contour points to the first wall mesh, to obtain a second wall mesh having the door opening; and replacing a raw wall mesh in the three-dimensional mesh model with the second wall mesh having the door opening, and generating the three-dimensional stereoscopic view of the indoor structure.

8. An electronic device, comprising a memory and a processor, wherein the processor is configured to execute a computer program stored in the memory; and the processor, when executing the computer program, performs operations comprising:

obtaining and splicing a plurality of frames of point cloud data to obtain a complete point cloud model of an indoor structure;

extracting point cloud plane features corresponding to the complete point cloud model, and classifying the point cloud plane features into indoor structure types comprising a floor, a wall, and a ceiling;

projecting point cloud data of the wall onto a plane of the floor to generate a planar grid graph; and generating a two-dimensional plane view of the indoor structure based on the planar grid graph.

9. The device according to claim 8, wherein before the extracting the point cloud plane features corresponding to the complete point cloud model, the operations further comprise:

obtaining point cloud density statistic information corresponding to the complete point cloud model; and removing point cloud data of an area having a density lower than a density threshold from the complete point cloud model based on the point cloud density statistic information.

10. The device according to claim 8, wherein before the projecting the point cloud data of the wall onto the plane of the floor to generate the planar grid graph, the operations further comprise:

determining point cloud planes in the complete point cloud model;

detecting a near-orthogonal point cloud plane and/or a near-parallel point cloud plane among the point cloud planes; and regularizing the near-orthogonal point cloud plane and/or the near-parallel point cloud plane by adjusting a corresponding plane equation, to obtain an orthogonal point cloud plane and/or a parallel point cloud plane.

11. The device according to claim 8, wherein the generating the two-dimensional plane view of the indoor structure based on the planar grid graph comprises:

obtaining trajectory data corresponding to each frame of point cloud data scanned by a scanner while in motion;

projecting the trajectory data onto the plane of the floor;

triangulating point cloud data of walls on the planar grid graph, to obtain a plurality of triangles of point cloud data of which circumscribed circles comprise no wall;

eliminating a triangle outside a visible range of sight according to the trajectory data, to obtain a two-dimensional floor mesh model; and regularizing a wall vector line in the two-dimensional floor mesh model, to obtain the two-dimensional plane view of the indoor structure.

12. The device according to claim 8, wherein after the generating the two-dimensional plane view of the indoor structure based on the planar grid graph, the operations further comprise:

obtaining trajectory data corresponding to each frame of point cloud data scanned by a scanner while in motion;

obtaining door opening data corresponding to the point cloud data of the wall according to the trajectory data;

obtaining room segmentation information of the two-dimensional plane view based on the door opening data; and generating a two-dimensional plane view having a room mark and a door mark based on the room segmentation information.

13. The device according to claim 8, wherein after the generating the two-dimensional plane view of the indoor structure based on the planar grid graph, the operations further comprise:

obtaining trajectory data corresponding to each frame of point cloud data scanned by a scanner while in motion, and obtaining ceiling height data of the indoor structure;

obtaining door opening data corresponding to the point cloud data of the wall according to the trajectory data; and generating a three-dimensional stereoscopic view of the indoor structure according to the two-dimensional plane view, the ceiling height data, and the door opening data.

14. The device according to claim 13, wherein the generating the three-dimensional stereoscopic view of the indoor structure according to the two-dimensional plane view, the ceiling height data, and the door opening data comprises:

generating a three-dimensional mesh model based on the two-dimensional plane view and the ceiling height data;

extracting, based on the door opening data, a first wall mesh where a door opening is located, and adding door opening contour points to the first wall mesh, to obtain a second wall mesh having the door opening; and replacing a raw wall mesh in the three-dimensional mesh model with the second wall mesh having the door opening, and generating the three-dimensional stereoscopic view of the indoor structure.

15. A non-transitory computer-readable storage medium, storing a computer program, wherein the computer program, when executed by a processor, causes the processor to perform operations comprising:

obtaining and splicing a plurality of frames of point cloud data to obtain a complete point cloud model of an indoor structure;

extracting point cloud plane features corresponding to the complete point cloud model, and classifying the point cloud plane features into indoor structure types comprising a floor, a wall, and a ceiling;

projecting point cloud data of the wall onto a plane of the floor to generate a planar grid graph; and generating a two-dimensional plane view of the indoor structure based on the planar grid graph.

16. The medium according to claim 15, wherein before the extracting the point cloud plane features corresponding to the complete point cloud model, the operations further comprise:

obtaining point cloud density statistic information corresponding to the complete point cloud model; and removing point cloud data of an area having a density lower than a density threshold from the complete point cloud model based on the point cloud density statistic information.

17. The medium according to claim 15, wherein before the projecting the point cloud data of the wall onto the plane of the floor to generate the planar grid graph, the operations further comprise:

determining point cloud planes in the complete point cloud model;

detecting a near-orthogonal point cloud plane and/or a near-parallel point cloud plane among the point cloud planes; and regularizing the near-orthogonal point cloud plane and/or the near-parallel point cloud plane by adjusting a corresponding plane equation, to obtain an orthogonal point cloud plane and/or a parallel point cloud plane.

18. The medium according to claim 15, wherein the generating the two-dimensional plane view of the indoor structure based on the planar grid graph comprises:

obtaining trajectory data corresponding to each frame of point cloud data scanned by a scanner while in motion;

projecting the trajectory data onto the plane of the floor;

triangulating point cloud data of walls on the planar grid graph, to obtain a plurality of triangles of point cloud data of which circumscribed circles comprise no wall;

eliminating a triangle outside a visible range of sight according to the trajectory data, to obtain a two-dimensional floor mesh model; and regularizing a wall vector line in the two-dimensional floor mesh model, to obtain the two-dimensional plane view of the indoor structure.

19. The medium according to claim 15, wherein after the generating the two-dimensional plane view of the indoor structure based on the planar grid graph, the operations further comprise:

obtaining trajectory data corresponding to each frame of point cloud data scanned by a scanner while in motion;

obtaining door opening data corresponding to the point cloud data of the wall according to the trajectory data;

obtaining room segmentation information of the two-dimensional plane view based on the door opening data; and generating a two-dimensional plane view having a room mark and a door mark based on the room segmentation information.

20. The medium according to claim 15, wherein after the generating the two-dimensional plane view of the indoor structure based on the planar grid graph, the operations further comprise:

obtaining trajectory data corresponding to each frame of point cloud data scanned by a scanner while in motion, and obtaining ceiling height data of the indoor structure;

obtaining door opening data corresponding to the point cloud data of the wall according to the trajectory data; and generating a three-dimensional stereoscopic view of the indoor structure according to the two-dimensional plane view, the ceiling height data, and the door opening data.

* * * * *